April 25, 1967 D. J. LESLIE 3,315,613
REMOTE CONTROL FOR MODEL TRAIN SYSTEM
Filed July 22, 1963 2 Sheets-Sheet 1
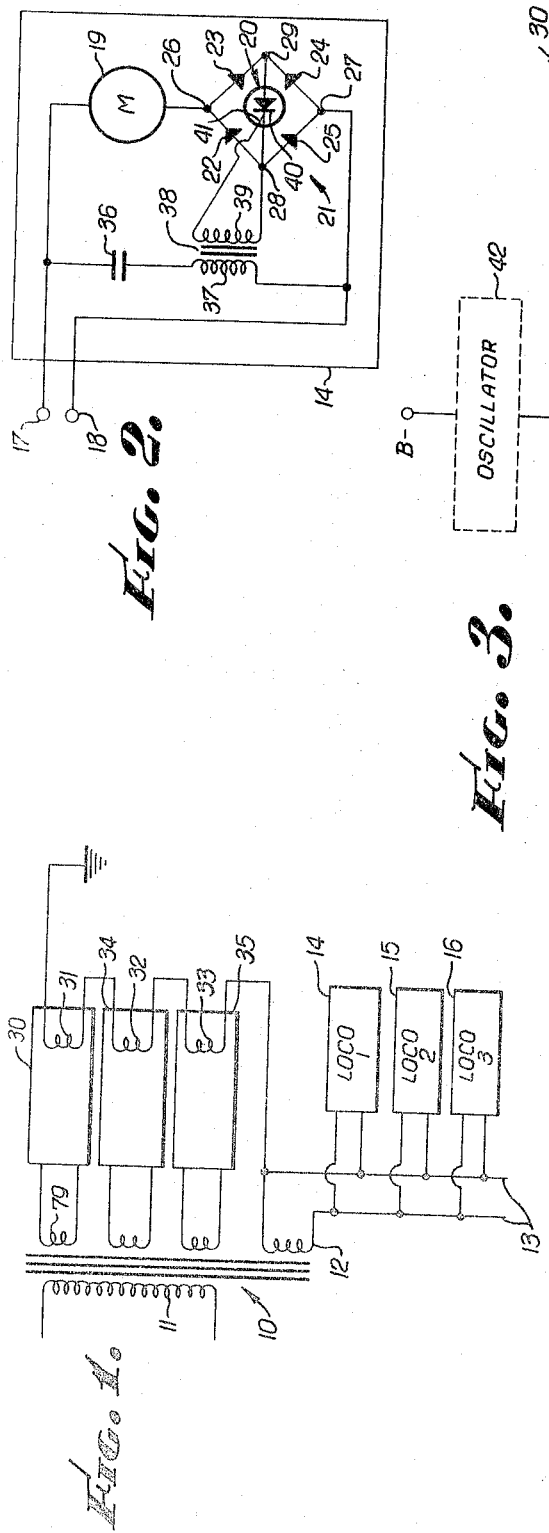
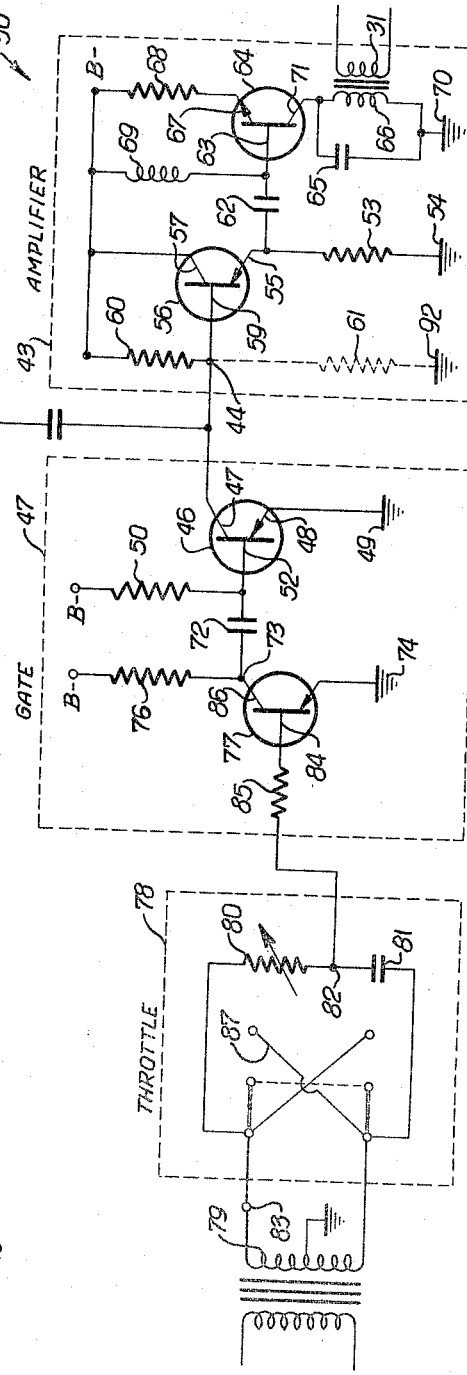
INVENTOR.
DONALD J. LESLIE
BY
Flam and Flam
ATTORNEYS.

United States Patent Office 3,315,613
Patented Apr. 25, 1967

3,315,613
REMOTE CONTROL FOR MODEL TRAIN SYSTEM
Donald J. Leslie, c/o Leslie Research Co., 267 S.
Fair Oaks Ave., Pasadena, Calif. 91105
Filed July 22, 1963, Ser. No. 296,590
5 Claims. (Cl. 104—151)

This invention relates to a control circuit for a model train, in which each locomotive on a common track system may be controlled independently, both as to speed and direction. A system of this general character is shown and described in my copending application, Ser. No. 201,343 filed June 11, 1962, now abandoned and entitled "Model Train Control System."

In my copending application, each locomotive motor circuit has a power circuit including one or more controlled rectifiers. The rectifiers are triggered at a selected phase angle during the cycle of the alternating current source. A tuned circuit operating in conjunction with the power circuit receives only a short duration signal of a particular frequency in order to operate the corresponding controlled rectifier.

Each locomotive has its own frequency channel, and a signal generator. Each signal generator drives the track system, which forms a common output for all of the generators. Such common connection of the several generators has heretofore resulted in great losses of power, requiring the total power to be increased greatly beyond a mere proportionate relationship to the number of independent trains. This was due to the fact that, in parallel drive system, each generator forms a low impedance for the others. In a series drive arrangement, the power levels had to be increased adequately to overcome the combined impedance of the others.

One of the objects of this invention is to provide a driving network in which signals are combined without appreciable losses whereby components of modest power rating can be effectively used. For this purpose, each generator has a parallel output circuit tuned to the signal frequency and in which a transformer forms one of the parts. A substantial voltage at the frequency of the generator is developed across the secondary. The secondary windings are series connected, for driving the track. Each secondary winding offers little impedance to the signals developed by other secondaries since as to such other signals the secondary presents an off-resonance impedance. Thus minimal losses result from the interconnection.

In order to provide suitable control, the signal applied to the track should have a short duration as compared with the track source. When a very slow speed is desired, the signal is generated at a phase angle approaching 180°. The controlled rectifier will, due to its own characteristics, remain on until the source voltage drops substantially to zero. By confining the width of the signal, it is ensured that the rectifier will not be triggered at the start of the next half cycle in which the energy is not intended to be applied to the motor. Another object of this invention is to provide a simple transistorized amplifier and gating circuit for a signal generator to fulfill the requirements of such a system.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a diagrammatic view of a model train control system incorporating the present invention;

FIG. 2 is a diagrammatic view illustrating one of the motor circuits and carried by the locomotive;

FIG. 3 is a diagrammatic view illustrating one of the remote transmitter sections.

Figure 4:
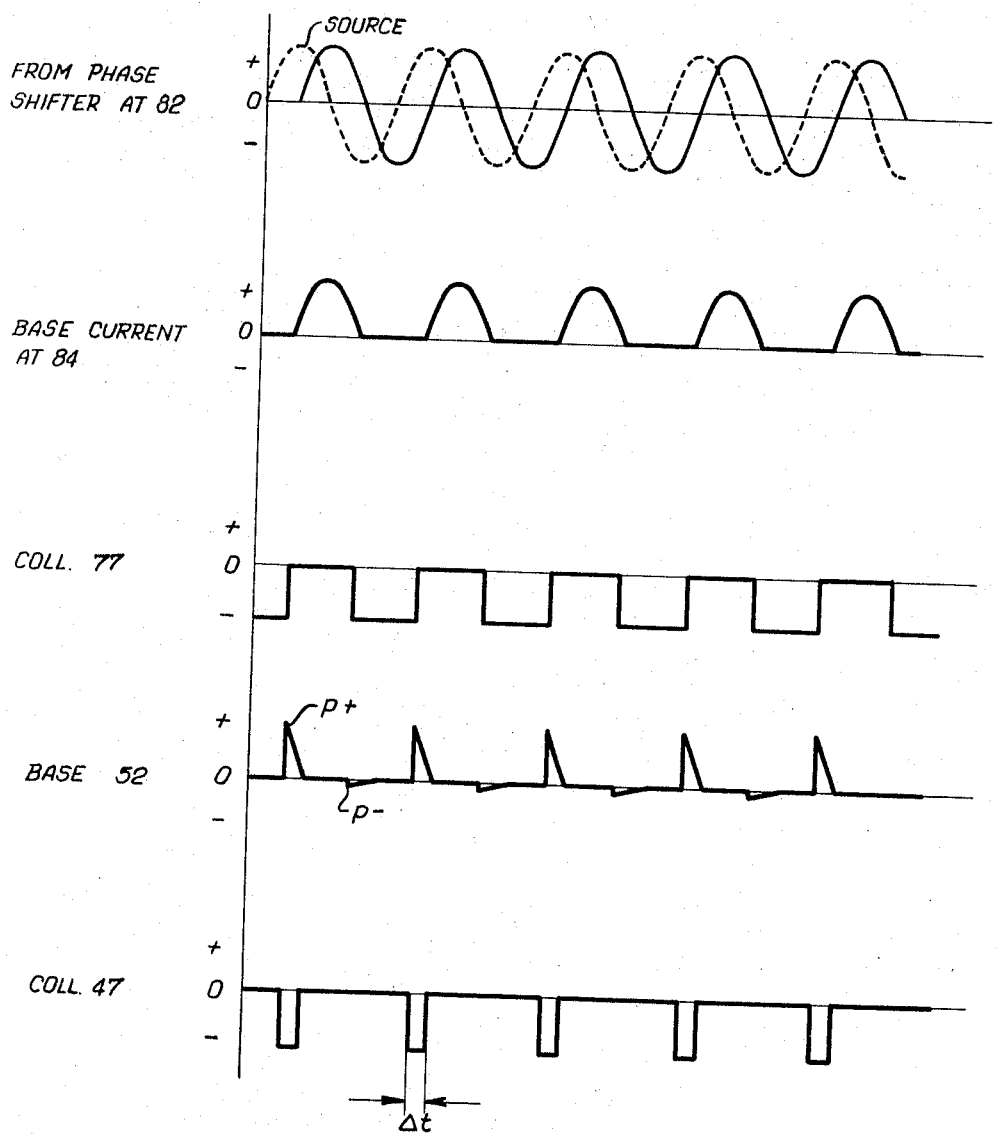
FIG. 4 is a graphical depiction of wave forms at various positions in the circuit shown in FIG. 3.

In FIG. 1 there is illustrated a power supply transformer 10 that has a primary winding 11 adapted to be connected to a suitable commercial source. The transformer 10 has a series of secondary windings, one of which 12 is adapted to provide energy for the tracks 13. Several locomotives 14, 15 and 16 cooperate with the track system 13; the motor circuit for one of the locomotives 14 is illustrated in FIG. 2.

Each locomotive has a pair of wheels 17 and 18 that in this example serve as brushes for cooperation with the track system 13. The motor 19 is a reversible or polarity sensitive direct current device. In the present example the motor 19 may have a permanent magnetic field. In order for the motor 19 to utilize the alternating current applied to the track system 13, a switching device in the form of a silicon controlled rectifier (SCR) 20 turns on only during alternate halves of the source cycle. Depending upon which halves of the cycle the SCR is turned on, the direct current motor 19 either moves the locomotive 14 in the forward direction or in the reverse direction.

In order serially to couple the SCR 20, which is a direct current device, into a circuit where current is intended to pass in both directions, a full wave bridge circuit 21 is shown by way of example. Other circuitry including a second SCR could be provided.

The bridge 21 has diodes 22, 23, 24 and 25, connected relative to input terminals 26 and 27 and intermediate terminals 28 and 29. One input terminal 27 is connected to the brush or wheel 18. One terminal of the motor 19 is connected to the other brush 17. The other terminal of the motor is connected to the other input terminal 26. The controlled rectifier 20 is connected across the intermediate terminals 28 and 29. The diodes 22, 23, 24 and 25 are so arranged that current can flow to the motor 19 whenever the silicon controlled rectifier 20 is on.

In order to switch the rectifier 20 of the locomotive 14 to its "on" state at selected half cycles, a high frequency pulse is generated by a remote control circuit 30 for locomotive 14 This pulse is directly applied to the track system 13 This pulse appears across the secondary winding 31 of a transformer structure. (FIGS. 1 and 3) hereinafter to be described.

As shown in FIG. 1, the transformer secondary winding 31 is connected in series with other secondary windings 32 and 33 of other remote control circuits 34 and 35 for the other locomotives 15 and 16 respectively. The series connected secondary windings 31, 32 and 33 are connected across the track system 13 and in parallel to the power transformer winding 12.

A tuned circuit mounted upon the locomotive discriminates against all but high frequency signal corresponding to the one intended to control the particular SCR 20 and the locomotive 14. The tuned circuit includes a condenser 36 and the primary winding 37 of the suitable transformer 38. The secondary winding 39 of the transformer 38 is connected across the cathode 40 of the SCR 20 and its gate 41. Assuming that the high frequency pulse is of suitable characteristic frequency, gate current is caused to flow in the SCR 20 at a specific time or phase angle in the source cycle. Once turned on, the SCR 20, due to its characteristics, stays on for the remainder of the half cycle.

If the phase angle of the high frequency triggering pulse relative to the source cycle is slightly more than zero degrees, then the motor 19 will be connected to the source substantially for the entire positive half cycle and the average voltage will be at a maximum. The motor 19 will operate the locomotive at maximum speed in one direction. As the phase angle of the pulse approaches 180°, the SCR 20 allows the source voltage to be applied to the motor 19 for lesser periods of time and the average voltage is much reduced. The speed of the motor 19 is correspondingly reduced but the direction of motion remains the same.

If the phase angle of the triggering pulse slightly exceeds 180°, then the motor will be connected to the source during substantially all of the negative half cycle and the motor 19 will operate at maximum reverse speed. As the phase angle approaches 360°, the motor 19 operates more slowly in the reverse direction. The control circuit 30 for providing requisite high frequency pulse for locomotive 14 is illustrated in detail in FIG. 3. Except for tuning, all of the circuits are the same.

An oscillator 42 operates continuously and at the precise frequency corresponding to that of the tuned circuit 36–37. However, the oscillator 42 is permitted to pass a signal to the amplifier 43 only during a very short interval at a particular phase angle in the cycle of the source voltage. The oscillator 42 is connected to the input terminal 44 of the amplifier 43. The amplifier 43 drives the secondary winding 31.

The input terminal 44 is normally shunted by a gating or switching transistor 46 forming a part of the gate circuit 47. Thus the input terminal 44 is connected directly to the collector 47 of the transistor 46 and its emitter 48 is directly connected to a ground terminal 49. Bias base current for normally keeping the transistor 46 on is provided via a resistor 50 that connects a supply terminal B— to the base 52 of the gating transistor 46. Thus the input terminal 44 and the signal from the oscillator 42 are effectively shunted through the gating transistor 46 and no signal appears at the transformer secondary 31.

In the manner hereinafter to be described, the gating transistor 46 is turned off for a short interval at a particular phase angle during the source cycle. During this short interval the output from the oscillator 42 is effectively applied to the amplifier input terminal 44 and a signal having the frequency of the oscillator 42 appears at the transformer secondary winding 31.

The amplifier 43 includes a main amplifier section and an emitter follower section that provides appropriate low input impedance to the main amplifier section to achieve suitable response. The emitter follower section includes an emitter follower resistor 53 connected to a ground terminal 54 and the emitter 55 of a transistor 56. The collector 57 of the transistor 56 is directly connected to the source terminal B—. The base 59 of the transistor 56 is connected to the input terminal 44.

The resistor 60 connects the base lead 59 to the source B— to determine operation of the transistor 56 in an amplification range. A resistor 61 may be provided between the input terminal 44 and the ground terminal 92 in order to stabilize the base current.

The output from the first or emitter follower stage is taken across the emitter follower resistor 53. The high frequency component passes through a blocking capacitor 62 to the base 63 of the main amplifying transistor 64. The transistor 64 has a load circuit tuned to oscillator frequency, and it includes a capacitor 65 and the primary winding 66 of the transformer on which the secondary 31 is wound. The emitter 67 of the main amplifying transistor 64 is connected to the source B— via an extremely small resistor 68. In order to provide suitable base current, the base 63 is connected to the supply B— via a choke coil 69. Current is drawn through the base 63 from the ground connection 70 through the transformer primary winding 66 and the collector 71. The resistor 68 establishes a preferential path for this biasing base current. The choke coil 69 prevents the high frequency signal applied to the base from being shunted to the source terminal 58.

When the oscillator signal is permitted to pass through the amplifier 43, high voltages at the frequency of oscillator 42 are induced in the transformer due to the high circulating currents in the tuned loop. The amplified signal appears at transformer secondary 31.

Since each of the transformers for the sections 30, 34 and 35 is included in a circuit tuned to a different frequency, the secondary windings 32 and 33 (FIG. 1) of the other circuits offer very little impedance to the signal developed at the transformer secondary winding 31. Accordingly, without any substantial loss due to the series connection, a substantial signal is applied to the track system for reception by the locomotive tuned circuit 36–37.

In order to turn the gating transistor 46 off for a short interval, a pulse of positive current is applied thereto via pulsing capacitor 72. One terminal of the capacitor 72 is connected to the base 52 of the gating transistor 46 and its other terminal 73 may be connected either to a ground connection 74 or to the source of B— via a small resistor 76, all depending upon the operation of a switching transistor 77. The condenser terminal 73 is connected to the collector of transistor 77. When the switching transistor 77 is turned on, the condenser 72 is grounded. When the transistor 77 is switched off, the condenser 72 is almost immediately charged via the resistor 76. The voltage at terminal 73 of condenser 72 and at the collector of transistor 77 is depicted at graph labelled "COLL. 77" in FIG. 4. At the instants of switchings of the transistor 77, positive and negative pulses P+ and P— are applied by condenser 72 to the base 52 and as depicted at graph "BASE 52" in FIG. 4. The negative pulses P— readily pass to the ground connection 49 through the normally on gating transistor 46, and accordingly are of no consequence. The positive pulses P+, however, cause the gating transistor 46 to be shut off until the charge on the condenser 72 is dissipated. See graph labelled "COLL. 47" in FIG. 4, which shows the on-off cycle of transistor 46 as a result. The loop in which this charge is dissipated includes the resistors 50 and 76. By suitably choosing the values of the resistors 50 and 76 relative to the capacity of the condenser 72, the effective width of the pulse is controlled and the duration of the off time of the gating transistor 46 is correspondingly determined. Accordingly, the gating transistor 46 is off only during the short interval of time $\Delta t$, and the signal from oscillator 42 is then applied to the amplifier 43 as previously described.

The switching transistor 77 is turned on and off at the frequency of the source and at a phase angle in the cycle determined by the throttle circuit 78. The throttle circuit is energized by transformer secondary winding 79, the voltage of which is necessarily in phase with the voltage at the secondary winding 12 for driving the track system 13. The transformer secondary winding 79 is connected across a phase shift network comprising a variable resistor 80 and a condenser 81. The voltage at the intermediate terminal 82 between the resistor 80 and the condenser 81 depends upon the relative impedance values of the resistor 80 and the condenser 81. When the resistance 80 is small, the terminal 82 is substantially in phase with the terminal 83 and of the order of a few degrees lagging. Thus if the resistor 80 is adjusted to a low value then the switching transistor 77 will be turned on at an early portion in the cycle, the terminal 82 being connected to the base 84 of the switching transistor 77 via a current limiting resistor 85.

When the resistor 80 has its value increased, the voltage at the terminal 82 lags further and further behind that of the terminal 83 and it approaches 180° lagging. Thus, as the resistor 80 is increased in value, the switching transistor 77 is turned on at later and later times during one-half of the source cycle.

The voltage at terminal 82 is depicted in FIG. 4 for an intermediate setting of resistor 80. The voltage is shown as lagging the source by about 90°. The base current flows for one-half of the cycle as depicted in FIG. 4 due to unidirectional characteristics of the transistor 77. This half-wave produces the collector voltage, pulses P+ and P−, and the timing interval Δt.

The switching transistor 77 operates on very small voltages and hence it is virtually insensitive to the magnitude of the voltage in the throttle circuit 78. Whenever the voltage at the terminal 82 is positive, the switching transistor 77 will be on and whenever the polarity of the terminal 82 is negative, the transistor 77 will be off. Accordingly, the square wave is developed at the collector 86 of the switching transistor and as depicted. The design of the throttle circuit 78 is accordingly uncritical as to voltage variation.

The adjustment of the resistor 80 is effective to change the phase angle substantially by 180°. In order to achieve control in the range of 180° to 360° and thus determine forward and reverse movement of the corresponding locomotive, a reversing switch 87 is provided between the transformer secondary winding 79 and the phase shifting network 80–81. When the switch is operated, the resistor connects to the opposite terminal of winding 79, and hence assumes a lagging phase angle with respect to this terminal, which, of course, is 180° lagging the terminal 83.

In operation, when it is desired that the locomotive 14 operate in a forward direction, the reversing switch 87 can be moved to a position corresponding to forward. Then to determined the phase angle at which the high frequency signal is transmitted to the track system 13 and thus the quantity of usable energy by the motor 14, the resistor 80 is adjusted. At a low value of the resistor the signal from the oscillator 42 is transmitted to the track system at an early stage in the source cycle and the motor 19 operates at maximum speed. As the resistor 80 is adjusted, the signals from the oscillator 42 occur at later and later times during the source cycle and reduce the energy available.

In order to reverse the direction of the locomotive, the switch 87 is operated and the resistor 80 then determines the portion of the source cycle which is effective for operation of the locomotive motor. The position of resistor 82 determines speed, whether forward or reverse.

The inventor claims:

1. For use in a model vehicle control system of the class in which a track system, energized by alternating current provides a common source for a number of polarity sensitive vehicle motors each having tuned receiver circuits for switching the motors on for the remainder of the half cycle of the source following the application to the track system of a high frequency pulse to which the corresponding receiver circuit is tuned: a number of remote control circuits, each including an oscillator, an amplifier circuit for the oscillator, and gating means for passing the oscillator signals to the amplifier circuit for a short interval during a selected portion of the source cycle; each of said gating means including a controllable device having alternate states; means causing the amplifier to be insensitive to the oscillator signals when the device is in one of its states and sensitive to the oscillator signals when the device is in the other of its state; a bias circuit for said device and causing it normally to be in its said one state; a condenser; switching circuit means providing alternate charging and discharging circuits for said condenser; throttle means for causing the switching circuit means to operate at the frequency of the source and at a selected phase angle with respect thereto; and means deriving pulses from said condenser as the switching circuit means is operated for momentarily changing the bias circuit to cause said gating device to assume its other state for a short interval during each cycle.

2. For use in a model vehicle control system of the class in which a track system, energized by alternating current, provides a common source for a number of polarity sensitive vehicle motors each having tuned receiver circuits for switching the motors on for the remainder of the half cycle of the source following the application to the track system of a high frequency pulse to which the corresponding receiver circuit is tuned: a number of remote control circuits, each including an oscillator, an amplifier circuit for the oscillator, and gating means for passing the oscillator signals to the amplifier circuit for a short interval during a selected portion of the source cycle; each of said gating means including a controllable device having alternate states; means causing the amplifier to be insensitive to the oscillator signals when the device is in the other of its states; a bias circuit for said device and causing it normally to be in its said one state; a condenser; one side of the condenser being connected to said bias circuit; switching means cooperable with the other side of said condenser; throttle means for causing the switching means to operate at the frequency of the source and at a selected phase angle with respect thereto; charging and discharging circuits for the condenser and alternately completed by said switching means, said charging and discharging circuits having relatively small resistances whereby short duration pulses are applied to said bias circuit to cause said gating device to assume its other state for a short interval during each cycle.

3. For use in a model vehicle control system of the class in which a track system, energized by alternating current, provides a common source for a number of polarity sensitive vehicle motors each having tuned receiver circuits for switching the motors on for the remainder of the half cycle of the source following the application to the track system of a high frequency pulse to which the corresponding receiver circuit is tuned: a number of remote control circuits, each including an oscillator, an amplifier circuit for the oscillator, and gating means for passing the oscillator signals to the amplifier circuit for a short interval during a selected portion of the source cycle; a number of remote control circuits for the vehicle motors each including an oscillator, a throttle circuit for providing a signal corresponding to the source delayed by a selected phase angle with respect to said source; a switching transistor switched on and off by the throttle signal, a gating transistor having alternate states, a bias circuit causing the gating transistor to assume one of its states, a condenser coupling the switching transistor and the bias circuit for causing the gating transistor to assume its other state for a short interval during each cycle of the source, and an oscillator dependent upon the gating transistor being in its said other state for applying a signal to said track system.

4. For use in a model vehicle control system of the class in which a track system, energized by alternating current, provides a common source for a number of polarity sensitive vehicle motors each having tuned receiver circuits for switching the motors on for the remainder of the half cycle of the source following the application to the track system of a high frequency pulse to which the corresponding receiver circuit is tuned: a number of remote control circuits, each including an oscillator, an amplifier circuit for the oscillator, and gating means for passing the oscillator signals to the amplifier circuit for a short interval during a selected portion of the source cycle; a number of remote control circuits for the vehicle motors each including an oscillator, a throttle circuit for providing a signal corresponding to the source delayed by a selected phase angle with respect to said source; a switching transistor switched on and off by the throttle signal, a gating transistor having alternate states, a bias circuit causing the gating transistor to assume one of its states, a condenser coupling the output of the switching transistor to the input of the gating transistor; means forming charging and discharging circuits of low time constants for said condenser and effective upon alternate operation of said switching transistor whereby two pulses during each cycle of the source are transmitted to the gating transistor, one of which is effective to cause the gating transistor momentarily to assume its other state, and an oscillator dependent upon the gating transistor being in its said other state for applying a signal to said track system.

5. For use in a model vehicle control system of the class in which a track system, energized by alternating current, provides a common source for a number of polarity sensitive vehicle motors each having tuned receiver circuits for switching the motors on for the remainder of the half cycle of the source following the application to the track system of a high frequency pulse to which the corresponding receiver circuit is tuned: a number of remote control circuits, each including an oscillator, an amplifier circuit for the oscillator, and gating means for passing the oscillator signals to the amplifier circuit for a short interval during a selected portion of the source cycle; a number of remote control circuits for the locomotive motors each including an oscillator, a throttle circuit for providing a signal corresponding to the source delayed by a selected phase angle with respect to said source; a switching transistor switched on and off by the throttle signal, a gating transistor having alternate states, a bias circuit causing the gating transistor to assume one of its states, a condenser coupling the output of the switching transistor to the input of the gating transistor; means forming charging and discharging circuits of low time constants for said condenser and effective upon alternate operation of said switching transistor whereby two pulses during each cycle of the source are transmitted to the gating transistor, one of which is effective to cause the gating transistor momentarily to assume its other state, an oscillator, an amplifier for said oscillator, said oscillator being connected to the input of the amplifier and to the output of said gating transistor, said gating transistor shunting the oscillator relative to the amplifier input when in its said one state.

References Cited by the Examiner

UNITED STATES PATENTS

| | | | |
|---|---|---|---|
| 1,259,135 | 3/1918 | Roe | 104—149 |
| 1,597,416 | 8/1926 | Mirick | 340—171 X |
| 2,073,443 | 3/1937 | Cardoza | 104—151 |
| 2,830,148 | 4/1958 | Barger | 104—151 X |
| 3,016,024 | 1/1962 | Silver | 104—149 |
| 3,211,111 | 10/1965 | Morley | 104—149 |

FOREIGN PATENTS 1,320,951 2/1963 France.

ARTHUR L. LA POINT, *Primary Examiner.*

S. T. KRAWCZEWICZ, *Assistant Examiner.*